July 9, 1940.  J. C. IRISH  2,206,960
PROCESS AND APPARATUS FOR BREAKING EGGS AND SALVAGING LIQUID EGG MATERIAL
Filed Oct. 28, 1938  4 Sheets-Sheet 1

Inventor
John C. Irish.
by Charles Miller
Attys.

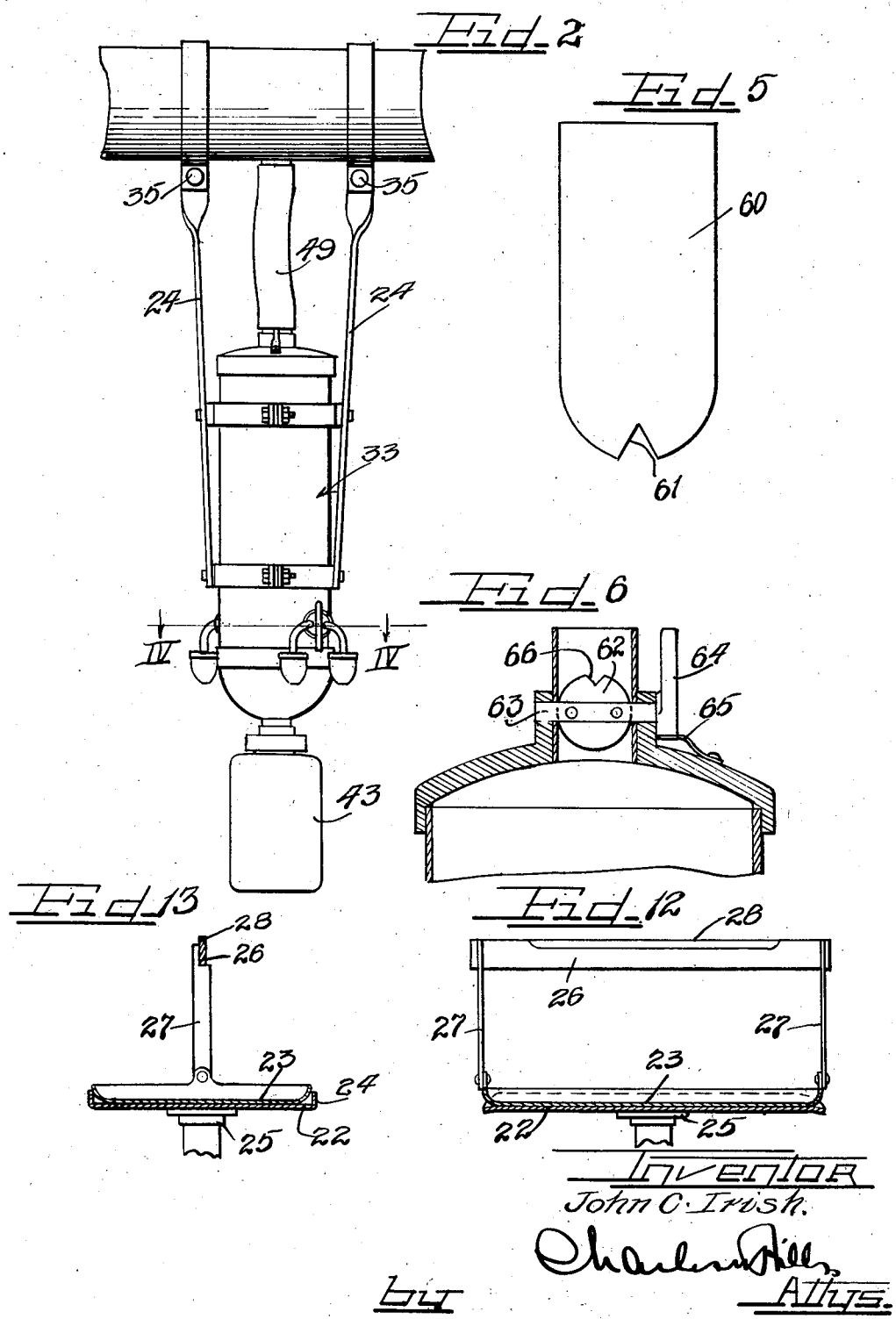

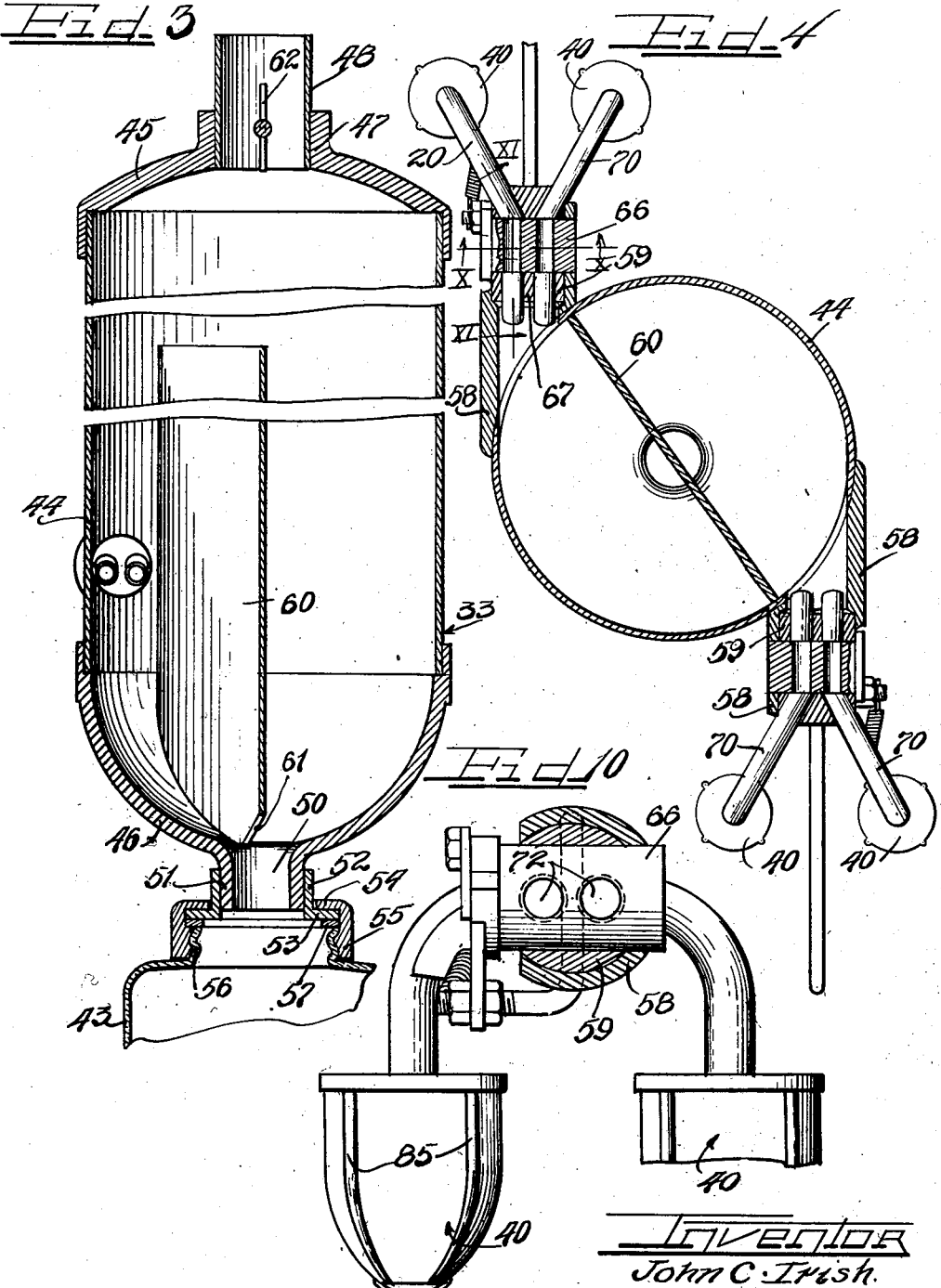

July 9, 1940.  J. C. IRISH  2,206,960
PROCESS AND APPARATUS FOR BREAKING EGGS AND SALVAGING LIQUID EGG MATERIAL
Filed Oct. 28, 1938  4 Sheets-Sheet 4
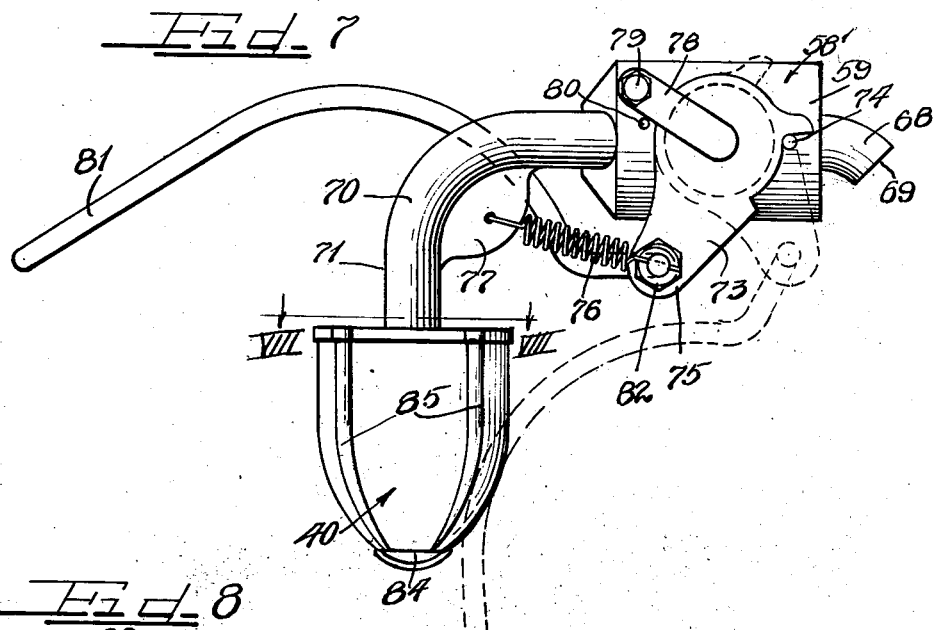
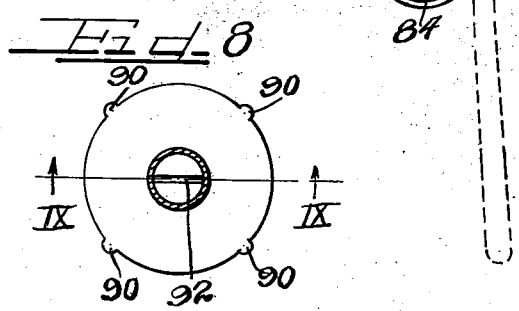
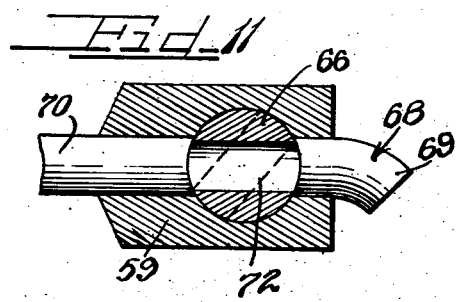
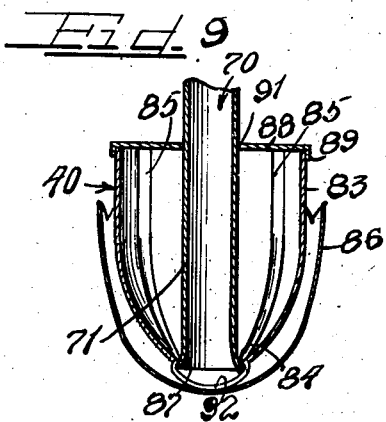
Inventor
John C. Irish.
by Charles Allen
Attys.

Patented July 9, 1940

2,206,960

UNITED STATES PATENT OFFICE 2,206,960

PROCESS AND APPARATUS FOR BREAKING EGGS AND SALVAGING LIQUID EGG MATERIAL

John C. Irish, Kansas City, Mo.

Application October 28, 1938, Serial No. 237,397

8 Claims. (Cl. 146—2)

This invention relates to a novel process for breaking eggs and extracting liquid egg material therefrom, including the salvaging of remnant liquid egg material which normally tends to cling to the inner surface of the egg shell. This invention also relates to a novel apparatus for carrying out certain steps of the novel process.

The economical extraction of liquid egg material from egg shells depends primarily upon two things: first, efficient removal of all of the liquid egg material contained in the egg shell including removal of the remnant liquid egg material which normally clings to the inner surface of the shell; and second, efficient and effective use of the operator's attention coupled with certain automatic process steps which will carry through without the operator's attention. The novel process and apparatus of the present invention provides for the breaking and dumping of one egg shell by the operator while the previously broken egg shell, now in the form of two egg shells is having remnant liquid egg material removed therefrom automatically. This removal of remnant liquid egg material takes place on a suction mandrel, the egg shell halves being automatically held in place by the suction pressure employed to remove the egg material. As the operator raises a pair of egg shell halves which have just been dumped, arrangement is made for temporary release of the suction pressure in the suction mandrels which will automatically cause the cleaned egg shells thereon to drop off by gravity. As the operator places the next set of egg shell halves on the suction mandrels, the suction pressure is again established, which in turn causes the egg shell halves to be retained in place on the suction mandrels and also causes the removal of the remnant liquid egg material therein.

It is an object of the present invention to provide a novel process and apparatus for removing liquid egg material from egg shells.

Another object of this invention is to provide a novel liquid egg material removing process wherein an operator may be breaking and dumping the principal contents of one egg while a previously broken and dumped egg shell is having the remnant liquid egg material removed therefrom. A further object of this invention is to provide novel apparatus for removing remnant liquid egg material from egg shell halves.

A still further object of this invention is to provide a novel apparatus unit for breaking and extracting liquid egg material from eggs.

Another and further object of this invention is to provide novel means for separating remnant liquid egg material from the current of air which has extracted it from the egg shell and to novel means for receiving and collecting the remnant liquid egg material.

The novel features which I believe to be characteristic of my invention are set forth with particularity in the appended claims. My invention itself, however, both as to its organization, manner of construction, and method of operation, together with further objects and advantages thereof, may best be understood by reference to the following description, taken in connection with the accompanying drawings, in which:

Figure 2 is an elevational view of one of the air cylinder and suction mandrel units shown in Figure 1;

Figure 3 is a vertical cross-sectional view of the air cylinder shown in Figure 2;

Figure 4 is a horizontal cross-sectional view of the air cylinder and suction mandrel assembly taken along the line IV—IV of Figure 2;

Figure 5 shows the baffle employed in the air cylinder;

Figure 6 is a partial sectional view of the upper part of the air cylinder showing the valve mechanism in the outlet conduit thereof;

Figure 7 is an enlarged view of the valve assembly and suction nozzles or mandrels;

Figure 8 is a top view of one of the suction nozzles or heads taken along the line VIII—VIII of Figure 7;

Figure 9 is a sectional view of the suction nozzle or mandrel taken along the line IX—IX of Figure 8;

Figure 10 is a partial sectional view of a portion of the valve assembly taken along the line X—X of Figure 4;

Figure 11 is a partial longitudinal sectional view of the valve taken along the line XI—XI of Figure 4;

Figure 12 is a vertical partial sectional view of one of the egg breaking bar and tray units of Figure 1; and Figure 13 is a cross-sectional end view of the breaking bar and tray unit.

Figure 1:
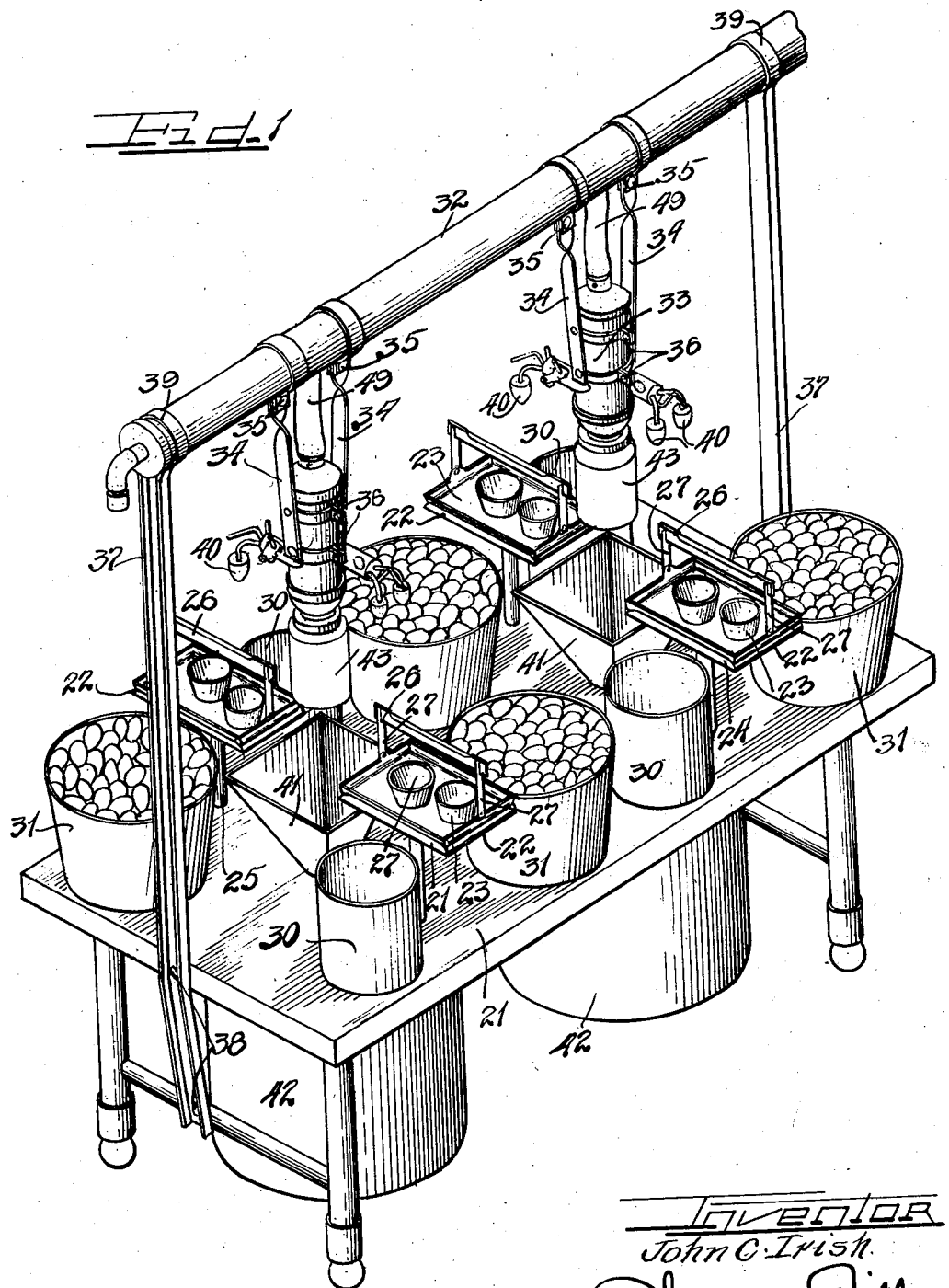
Figure 1 is an isometric view of an apparatus unit employed in breaking and salvaging liquid egg material from eggs.

In Figure 1 of the drawings, I have illustrated a novel apparatus for carrying out certain steps of my novel process of breaking eggs and salvaging liquid egg material. This apparatus will now be described in detail, since it is believed that the novel aspects of my process may best be brought out and exemplified by a description and a discussion of the apparatus.

As is shown in Figure 1, a table 21 is provided upon which the egg breaking and egg salvaging equipment is mounted. While only four working stations for girls who are to operate the equipment are shown, in the drawings, it will of course be understood that any convenient number may be provided. Mounted at regular intervals along each side of the table 21 are a plurality of tray support shelves 22. The shelves 22 are designed and arranged to receive a tray 23, side flanges 24 being provided along the transverse edges of the shelves are supports 22 to retain the tray 23 in place. The shelf or support 22 is supported on an upright post 25 which is supported and secured to the table 21 in any suitable manner, the post 25 preferably extending through the table top and being secured to the underside thereof.

Each tray 23 is equipped with an egg-breaking bar 26. The egg-breaking bar 26 is carried on a pair of uprights 27 which in turn are riveted to the tray 23, as is clearly shown in Figures 12 and 13 of the drawings. The egg-breaking bar 26 is welded or brazed to the upright 27, or it may be secured to the upright 27 in any other suitable manner. The upper edge of the bar 26 is given a V-shaped configuration over a portion thereof, as is indicated at 28. This sharpened portion of the bar 26 provides a convenient edge over which the eggs may be broken. By mounting the egg-breaking bar 26 directly to the tray rather than to the supporting shelf 22, it will at once be appreciated that the tray 23 and the bar 26 may be readily and conveniently slid out of the support 22 and washed or otherwise cleaned at will. The trays 23 are designed and arranged to carry a plurality of cups 29 into which the contents of an egg may be dumped immediately after it is broken by the operator on the bar 26.

To one side of each support 22 a container 30 is provided into which the contents of a cup may be poured if the egg is fresh. On the opposite side of each support 22 a container 31 of eggs is placed.

Mounted centrally along the length of table 21 and supported thereover is an air suction line 32 leading to a suitable vacuum pump (not shown). Supported from and connected to the air suction line 32 at regular intervals along its length are a plurality of air cylinders 33. The air cylinders 33 are supported from the suction pipe 32 by means of a pair of straps 34, which are bolted to the suction pipe line 32 and to the air cylinder as at 35 and 36 respectively. The suction pipe line 32 is conveniently supported at intervals along the cable by uprights 37, which as shown are in the form of a channel iron which is bolted to the table 21 as at 38 and is strapped to the pipe 32 as at 39.

Mounted on each air cylinder 33 are two pairs of suction nozzles or mandrels 40. More specifically, one pair of suction nozzles 40 is provided for each operating station, there being one air cylinder 33 for each two operating stations (one on each side of the table).

As will presently be explained in detail, the suction nozzles or mandrels 40 are adapted to have an egg shell half placed over the end thereof while an air stream is being sucked through the nozzle. Accordingly, the nozzles 40 are conveniently located slightly above the trays 23 and slightly inwardly of the table 21. A chute 41 is located below each air cylinder 33, the chute being provided with a flaring mouth which extends out below the nozzles 40. Each chute 41 leads into a refuse container 42 disposed below the table 21. The chutes 41 are so shaped and dimensioned that when the suction pressure is released in the suction nozzles or mandrels, the egg shell half clinging thereto will drop by gravity into the chute 41 and thence into the refuse container 42.

Connected to the lower end of each cylinder 33 is a remnant egg material container 43 which collects the remnant liquid egg material sucked from the egg shell halves through the suction nozzles or mandrels 40.

The air cylinder 33 is illustrated in detail in Figures 2 to 6 of the drawings. Turning first to Figures 3 and 4, it will be observed that the air cylinder is built up of a long piece of cylindrical tubing 44, which is provided with a head-piece or cap 45 at the top and a lower cap or head-piece 46 at the bottom. The caps 45 and 46 are secured to the cylinder 44 in any suitable manner, such as by welding or brazing. The top cap 45 is provided with a central opening, which is defined by an upstanding flange 47. A short piece of substantially rigid piping 48 is secured in the opening in the top cap 45. It is to be understood that the short piece of piping 48 is arranged to receive the lower end of the rubber or other flexible tubing 49, as shown in Figures 1 and 2, the rubber tubing 49 being preferably sprung or stretched over the short pipe 48. An opening 50 is also provided in the lower cap 46, the opening 50 being defined by a downwardly extending circular flange 51. A collar 52 is secured over the flange 51. The collar 52 is provided with a transverse flange 53 over which is seated a complementary flange 54 of an internally threaded collar member 55. The collar member 55 is adapted to make a threaded engagement with the mouth 56 of the remnant liquid egg material container 43. A washer 57 is preferably provided to make a tight seal at this point.

Secured on opposite sides of the cylinder 44 and relatively near the bottom thereof are a pair of ferrules 58 (see Figure 4) which are welded or brazed to the cylinder 44, in the manner shown in Figure 4, the cylinder 44 being suitably apertured opposite each ferrule 58. The ferrules 58 are designed to house the valve bodies 59 (one for each ferrule) of the main operating valves 58' in the suction line to the nozzles 40 from the air cylinder 33. As will presently be described in detail, the suction nozzles or mandrels 40 are designed and arranged to be carried and structurally supported by the ferrules 58 and the valve bodies 59.

A vertically disposed baffle plate 60 which extends from the lower part of the air cylinder 33 to a point in proximity to the top of cylinder 33 but spaced therebelow divides the air cylinder 33 substantially into two parts. The bottom of the baffle plate 60 is notched out, as at 61, to permit some cross flow of air at the base thereof.

As will be apparent from an inspection of Figure 4, the air as it is sucked in through the nozzles 40 strikes the inner wall of the cylinder 44 substantially at a tangent thereto, rushes around a portion of the inner surface of the wall of the cylinder 44 and then strikes the baffle plate 60. The inrushing air or air stream from the nozzles 40 on the opposite side of the air cylinder 33 enters simultaneously the cylinder 44 but is substantially segregated from the first-mentioned air stream by the baffle 60. This is by virtue of the fact that the air coming in through the second set of nozzles strikes the opposite side of the baffle plate 60 from the air coming in from the first set of nozzles.

As may be seen best in Figures 3 and 6 of the drawings, the outlet from the air cylinder 33 is provided with a butterfly valve 62 which is mounted on a valve pin 63. The valve pin 63 is equipped with an operating handle 64, the latter being preferably biased to its open or closed position by a leaf spring 65. The butterfly valve 62 is also preferably notched as at 66 to permit some flow of air through the valve when the valve handle 64 is in its fully closed position. This valve 62 is arranged to be closed when the jar 43 is to be removed from the air cylinder 33. The notch 66 in the valve 62 permits enough air to be sucked therethrough to prevent any liquid egg material dropping out the opened bottom of the cylinder 33 but does not permit enough flow of air to hold an egg shell half on the nozzle 40.

The air cylinders 33 which are suspended at regular intervals along the air suction line 32 and which communicate therewith have been described. It has also been pointed out that the remnant liquid egg material in the egg shell halves is sucked out through suitable nozzles 40 over which the shell halves have been placed and into the air cylinders 33, where it is separated from the air stream and deposited in the jar 43. To provide the necessary control of this operation, a valve assembly 58' is placed between the nozzle 40 and the air cylinder 33.

The valve assembly 58' by which control of the suction pressure in the nozzles 40 is obtained is illustrated in detail in Figures 4, 7, 10 and 11 of the drawings. The valve assembly includes in general a valve body 59 which is transversely bored for the reception of a valve barrel 66. The valve body 59 is provided also with a pair of longitudinally extending passageways 67 in which a pair of pipes 68 with downturned ends 69 are provided at one end and in which a second pair of pipes 70 which are arranged to carry the nozzles 40 are provided at the opposite ends. The pipes 68 are slightly turned down at 69 in order to direct the air stream slightly downwardly as it enters the air cylinder 33.

From a close inspection of Figure 4 of the drawings, it will be observed that the pipes 70 diverge outwardly from the valve body 59, and as may be seen in Figure 7, they terminate in a downwardly extending portion 71 upon which the nozzles 40 are mounted.

The valve barrel 66 is provided with a pair of parallel passageways 72 which are contiguous with the pipes 68 and 70. As will readily be understood from an inspection of Figure 11 of the drawings, the valve is closed upon rotation of the valve barrel 66 to a position which places the passageway 72 out of communication with the pipes 68 and 70.

Secured to one end of the valve barrel 66 is a plate 73 which preferably has a shape substantially similar to that shown in Figure 7 of the drawings. A pin 74 is provided on the valve body 59 which extends into engagement with the plate 73 and which is arranged to limit the angular movement or rotation of the plate 73. The lower end 75 of the plate 73 carries a helical spring 76 which is connected at its opposite end to a flange plate 77 carried in the pipe 70. This helical spring 76 biases the valve barrel 66 to its open position. A locking arm 78 is mounted on the valve body 59 by a stud bolt 79 and is arranged to extend over the outer face of the plate 73 to retain the plate 73 and the valve barrel 66 in assembled position. A stop pin 80 is preferably provided to define the preferred position of the locking arm 78. To remove the valve barrel 66 from the valve body 59, it is of course only necessary to loosen the stud bolt 79, lift the arm 78 out of position over the plate 73, and then lift the valve barrel 66 out of the valve body 59.

The valve barrel 66 is arranged to be operated by an operating handle 81 which is secured to the lower end 75 of the plate 73, it being preferably fastened in place by threading the end thereof and screwing a suitable complementary nut 82 thereover. It is to be understood that when the operating handle 81 is depressed, the valve barrel 66 moves from its full line position, as shown in Figure 11 to its dotted line position, as shown in Figure 11. This shuts off the flow of air through the nozzles 40, the valve body 59 into the air cylinders 33.

The suction nozzle or mandrel 40 over which the egg halves are raised to be placed is illustrated in detail in Figures 7, 8, 9 and 10. One form of suction nozzle or mandrel which has been found highly satisfactory is a sheet metal ovoid-shaped shell 83, which has an opening 84 in its lower end and which is provided with a plurality of longitudinally extending raised portions or ridges 85. The ovoid shell 83 is preferably smaller in diameter than the smallest egg shell which is apt to be inserted over its end. The raised portions or ribs 85 are designed to assure a proper or minimum spacing between an egg shell half 86 (see Figure 9) and the nozzle 40. That is to say, if these ribs 85 are not provided on the exterior surface of the ovoid shell 83, an egg shell half 86 might be placed on the nozzle or mandrel 40 in such a way that a portion of the inner surface of the egg shell would rest flush against the inner surface of the ovoid shell 83 (the opposite portion of the egg shell half 86, of course, being widely spaced under this circumstance from the ovoid shell 83). This would prevent a proper extraction of the remnant liquid egg material from the egg shell half 86.

The lower end 71 of the pipe 70 extends centrally down through the ovoid shell 83 and terminates at the opening 84 of the latter. The extremity 87 of the pipe 70 is slightly flared to hold the ovoid shell 83 thereon. The upper part of the ovoid shell 83 is closed by a cap 88 having a downwardly turned marginal portion 89 which is adapted to fit snugly over the upper marginal edge of the ovoid shell 83. The marginal edge 89 is of course pressed out, as at 90, opposite the raised portions or ribs 85 of the shell 83 in order to fit snugly thereover. The cap 88 is, of course, provided with a central opening 91 through which the lower end 71 of the pipe 70 may extend.

In order to properly space the egg shell half 86 from the lower end of the nozzle or mandrel 40, a spacing wire 92 is secured in any suitable manner to the nozzle assembly. As may be seen in Figure 9, the spacing member 92 prevents the egg shell half 86 from closing the opening in the head of the nozzle 40 and thus restricts or shuts off the free flow of air down over the inner surface of the shell 86 and up through the pipe 70.

I have now described one form of apparatus which may be used in carrying out my novel process. This process will now be described in detail, reference being made to the apparatus which has been illustrated as one form of apparatus capable of carrying out certain of the steps of the novel process.

A girl or other operator is stationed in front of one of the air cylinders 83 and one of the trays 23. A supply of eggs is placed beside her in a container 31 and a receiving jar or container 30 is also provided in front of her on the table 31. She now picks up an egg from the container 31, cracks it over the bar 26 into two halves and dumps the contents in one of the cups 29 on her tray 23. She then smells the egg shell halves and otherwise inspects the same to determine whether the egg is bad or not. If the egg is in good condition, she places the egg shell halves over the two nozzles 40 which are directly in front of her. She then dumps the contents of the cup 29 into the container 30. It will, of course, be understood that while I have made reference to the fact that she smells the egg shell halves to determine whether the egg is in good condition or not, she may do this by smelling the contents in the cup 29 rather than by smelling the egg shell halves, or she may do both.

While the girl is dumping the contents of the cup 29 into the container 30 and while she is breaking a second egg from the container 31 over the bar 26, the air stream which is being sucked through the nozzles 40 is extracting the remnant liquid egg material from the egg shell halves which have been placed over the nozzles 40. It will be remembered that the girl does not have to hold the egg shell halves in place over the nozzles, for the suction pressure in the nozzles themselves serve to hold the egg shell halves in position against the pull of gravity.

The flow of air down over the inner surface of the egg shell half 86 and then up through the pipe 70, the valve assembly 58', the pipe 69 into the air cylinder 33 causes the remnant liquid egg material which normally clings to the inner surface of the egg shell to be extracted therefrom and deposited in the jar 43 which is supported from the lower end of the air cylinder 33.

As has previously been pointed out, the impingement of the air stream on the baffle plate 60 in the air receiver 33 causes the remnant liquid egg material to be deposited from the air stream down through the neck 50 into the container 43. After the second egg has been broken by the girl, and is inspected to determine whether it is good or not, the girl lifts the egg shell halves of the second egg up towards the pair of nozzles 40 which are in front of her. As she lifts up the second egg she depresses the operating valve handle 81 which shuts off the flow of air through the nozzle 40, the pipe 70 and the valve body 59. This shutting off of the suction pressure causes a release of the egg shell halves which have been held on the nozzles 40 against the action of gravity by the suction pressure. The egg shell halves then fall directly into the chute 41, from whence they pass into the refuse container 42. The girl then releases the handle 81 and the spring 76 causes the valve 66 to be returned to its normally opened position. She then places the egg shell halves of the second egg on the nozzle and immediately proceeds with the breaking of a third egg. The egg shell halves of the second egg are, of course, held in place on the nozzles 40 against the action of gravity by the suction pressure in the nozzles.

When a bad egg has been broken (which is very rarely the case), the cup 29 into which the contents of the bad egg have been dumped is set to one side, and the egg shell halves of the bad egg are immediately thrown into the chute 41 by hand, where they drop into the refuse container 42. While the contents of the bad egg which has been dumped into the cup 29 may be also disposed of by placing the same into the chute 41, it is the general practice to set this cup aside and have a second girl or operator come along and pick the same up and take it over to an inspection table where it is examined to determine whether it is truly bad or not and where thereafter the cup is thoroughly cleaned. A second cup on the tray 23 is thereafter used as the succeeding eggs are broken.

When the jar or container 43, suspended from the lower end of the air cylinder 33, becomes full, the operator closes the butterfly valve 62 by turning the valve handle 64 through approximately 90 degrees. The internally threaded collar 55 is then unscrewed from the jar 43 until the latter is freed and it is thereafter removed and emptied into a suitable container for receiving the remnant liquid egg material. During the time that the jar 43 is off of the lower end of the air cylinder 43, the passage of some air through the notched portion 66 of the butterfly valve 62 prevents any liquid egg material which may have clung to the inner walls of the air cylinder 33 or the baffle plate 60 from dropping through the opening at the bottom of the air cylinder 33. After the jar 43 has been replaced, the valve 62 is opened, and the air cylinder and associated nozzles or mandrels 40 are again available for use.

From the above description, it will be apparent that I have provided an extremely simple and efficient process for breaking eggs and extracting liquid egg material therefrom, including remnant liquid egg material. It will further be observed that I have provided novel and reliable apparatus for carrying out certain of the steps of the novel process. It has been found in practice that the average girl by following my novel process and by employing apparatus of the type herein described is able to break between ten to twelve thousand eggs a day. This, of course, would not be possible if the girl's attention were necessary during the time that the remnant liquid egg material is being removed from the egg shell half.

While I have shown a particular embodiment of my invention, it will, of course, be understood that I do not wish to be limited thereto, since many modifications may be made, and I therefore contemplate by the appended claims to cover all such modifications as fall within the true spirit and scope of my invention.

I claim as my invention:

1. Salvaging apparatus for extracting remnant liquid egg material from egg shell halves including a suction line in which a sub-ambient pressure is maintained, an air receiver in communication with said suction line, an egg shell mandrel structurally supported by said air receiver and in communication therewith, and valve means between said mandrel and said air receiver for controlling the passage of air therebetween, whereby an egg shell half placed over said mandrel and having remnant liquid egg material clinging to the inner surface thereof has said remnant liquid egg material extracted therefrom by a flow of air over the inner surface of said egg shell half through said mandrel into said air receiver, said egg shell half being automatically held in place on said mandrel by the suction pressure therein, and being released therefrom by closing said valve means.

2. Salvaging apparatus for extracting remnant liquid egg material from egg shell halves including a suction conduit in which a sub-ambient pressure is maintained, and an air receiver suspended from said conduit, a communicating passageway leading from said suction conduit into the upper part of said air receiver, a liquid egg material receiver suspended from the lower part of said air receiver and in direct communication therewith, and an egg shell mandrel structurally supported by said air receiver and in communication with said air receiver at a point intermediate the communicating passageways to said suction conduit and to said liquid egg material receiver, said air receiver having a vertically disposed baffle plate against which the air stream from said mandrel impinges before passing on to said suction conduit.

3. Salvaging apparatus for extracting remnant liquid egg material from egg shell halves including a suction line in which a sub-ambient pressure is maintained, a substantially vertically disposed air cylinder, the upper part of said cylinder communicating with said suction line, suction mandrels mounted on diametrically opposite sides of said cylinder, pipes connecting said mandrels to said cylinder, the axis of said pipes at their point of entry into said cylinder being substantially tangential to the circular cross-sectional configuration of said cylinder.

4. Salvaging apparatus for extracting remnant liquid egg material from egg shell halves including a suction line in which a sub-ambient pressure is maintained, a substantially vertically disposed air cylinder, the upper part of said cylinder communicating with said suction line, suction mandrels mounted on diametrically opposite sides of said cylinder, and a vertically disposed baffle plate extending substantially across a diameter of said cylinder and extending from substantially the bottom of said cylinder to a point in proximity to the top of said cylinder but spaced therefrom, said mandrels being connected by conduits to the interior of said cylinder on diametrically opposite sides of said baffle plate, whereby the air streams flowing through said suction mandrels to said suction line impinge on opposite sides of said baffle plate.

5. Salvaging apparatus for extracting remnant liquid egg material from egg shell halves including a suction line in which a sub-ambient pressure is maintained, a substantially vertically disposed air cylinder, the upper part of said cylinder communicating with said suction line, suction mandrels mounted on diametrically opposite sides of said cylinder, pipe connecting said mandrels to said cylinder, the axis of said pipe at the point of entry into said cylinders being substantially tangential to the circular cross-sectional configuration of said cylinder, and also being directed angularly downwardly, a vertically disposed baffle plate extending completely across a diameter of said cylinder adjacent said point of entry of said pipes connecting said mandrel to said cylinder, but on the inbored side thereof, thereby to permit the air stream flowing through said mandrels into said air cylinder to pass along a substantial portion of the inner surface of said cylinder before impinging on said baffle plate, said baffle plate extending from substantially the bottom of said air cylinder to a point in proximity to the top of said cylinder but spaced therefrom.

6. A suction mandrel for removing remnant liquid egg material from egg shell halves comprising an ovoid metal shell having an opening at its apex and a cap closing its opposite end, said shell having a plurality of longitudinally extending pressed-up ridges in its outer surface, and a convexly bent wire of relatively small cross-section compared to the opening in the apex of said shell and extending across the opening of said shell, whereby the opening in such shell is maintained free at all times.

7. The process of breaking egg shells and removing egg material therefrom which includes breaking an egg shell in half, inspecting the contents thereof for freshness, inverting the egg shell halves over a container to empty the major portion of the liquid egg material therein, and extracting the remnant liquid egg material which normally clings to the inner surface of the egg shell by positioning the egg shell halves in contact with sucking streams of air flowing over the inner surfaces of said egg shell halves and by which they are supported in said position while simultaneously breaking, inspecting, and emptying a second pair of egg shell halves.

8. In an apparatus for recovering remnant egg material from the interior of egg shell halves, a plurality of nozzles each shaped to have fitted thereover and to closely conform to the inner surface of an egg shell half from which egg meats have been previously removed, means for impelling air along the inner surface of said shell halves and between said surface and each of said nozzles under relatively slight pressure so as not to break the egg shell halves, and an air and egg separating chamber to which said nozzles are connected on opposite sides thereof, said chamber being in closed communication with the spaces between the inner surfaces of the shell halves and both of said nozzles so as to receive therefrom egg material entrained by and forced from said inner surfaces of said shell halves by said impelled air, said chamber having baffle means therein disposed between the discharges of said nozzles connected to said chamber so that remnant egg material entering the chamber strikes said baffle means and gravitates to a lower portion thereof, and incoming air leaves the chamber thereabove whereby to prevent foaming of the material in the chamber.

JOHN C. IRISH.